July 9, 1957
C. H. BROWN
2,798,715
BIT HOLDER FOR CUTTER CHAINS
Filed Nov. 17, 1954
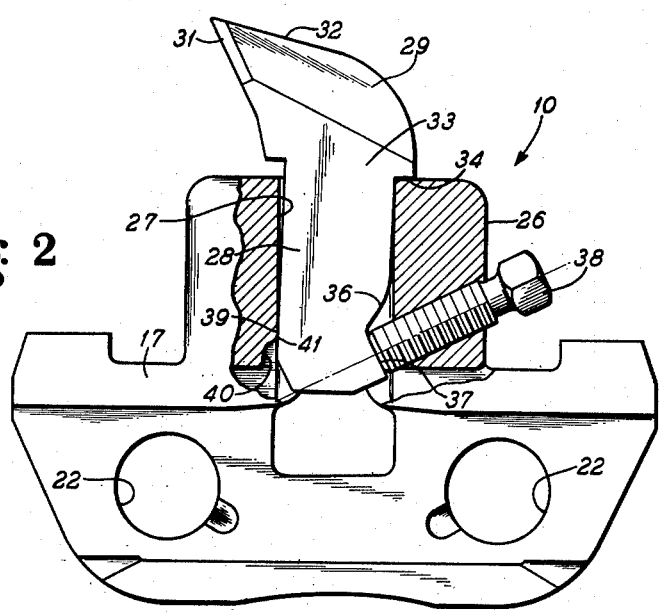
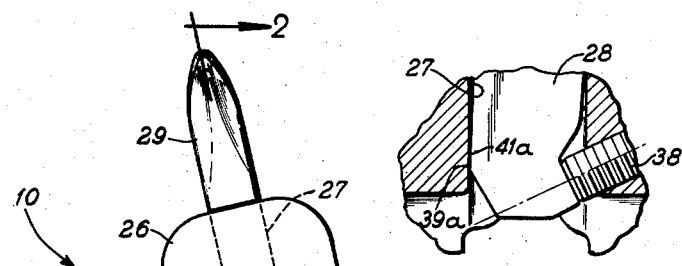
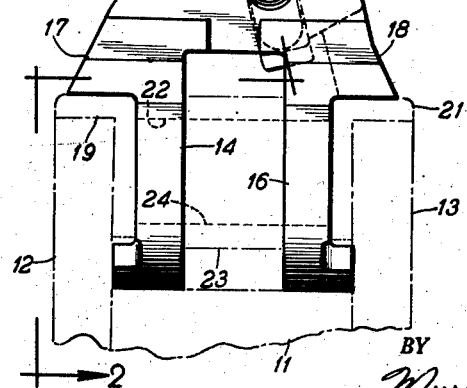
INVENTOR.
Clarence H. Brown
BY
Murray G. Gleeson
ATTORNEY

United States Patent Office 2,798,715
Patented July 9, 1957

2,798,715
BIT HOLDER FOR CUTTER CHAINS

Clarence H. Brown, Chicago, Ill., assignor to Goodman Manufacturing Company, Chicago, Ill., a corporation of Illinois Application November 17, 1954, Serial No. 469,332

2 Claims. (Cl. 262—33)

This invention relates generally to improvements in mountings for cutting tools, and particularly to improvements in mounting cutter bits in the cutter chains employed in, by way of example, continuous mining machines.

Endless cutter chains, for such mining machines, are characterized by bit blocks connected by links or straps, each of the bit blocks having a bit lug with a recess therein to secure a cutter bit. The cutter bits ordinarily have a cutter tip faced with tungsten carbide or other abrasion resisting material, and the shank of the cutter bit is arranged to be held in the recess by a set screw or similar fastening means. However, the shank may be made of a material of such hardness that the set screw cannot effectively grip the shank, and it is difficult, therefore, to hold the cutter bit within its recess.

According to the present invention, an improved lug is provided which relieves the set screw from all of the load of cutting. In the conventional case, the set screw is so placed in the lug that the set screw exerts its pressure on the front edge of the bit shank so that the set screw must take the entire reaction of the load imposed on the bit point by the work being done. In the present, improved design, the metal of the lug itself takes all of these loads with the result that the bit is gripped in a better manner, with improved leverage, because of better disposition of the moment arms.

With the foregoing considerations in mind it is a principal object of this invention to provide an improved construction for holding cutter bits in the bit block of a cutter chain or the like.

Other objects and important features of the invention will be apparent from a study of the specification following taken with the drawing, which together describe and illustrate a preferred embodiment of the invention, and what is now considered to be the best mode of applying the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the purview of the subjoined claims.

In the drawing:

Fig. 1 is an end elevation view of a bit block of an endless cutter chain, said bit block having a cutter bit and mounting therefor embodying the improvements according to the present invention;

Fig. 2 is a side elevation view of the cutter block shown in Fig. 1, the recess thereof being shown in section to show details of mounting of the cutter bit; and Fig. 3 is a fragmentary sectional view similar to that shown in Fig. 2 illustrating another form of construction for supporting and holding a cutter bit.

Referring now particularly to Figs. 1 and 2 of the drawing, the improvements according to the present invention are embodied in a cutter bit block referred to generally by the reference numeral 10. Such a bit block 10 may be one of a number pivotally connected together and arranged to move in an orbital fashion such as in the cutter chain of a mining machine or the like.

As seen in Fig. 1, such a cutter block may be guided in a cutter chain guide referred to generally by the reference numeral 11 and having a pair of spaced limbs 12 and 13. The bit block 10 likewise has a pair of spaced limbs 14 and 16 which are integral therewith and which extend between the spaced limbs 12 and 13 of the guide 11. The two limbs 14 and 16 extend from shoulder portions 17 and 18 of the bit block 10, and such shoulder portions are arranged to ride upon angle shaped wear members 19 and 21 supported respectively upon the spaced limbs 12 and 13.

Each of the limbs 14 and 16 of the bit block 10 is drilled or bored as at 22 whereby the bit blocks 10 may be connected by a pin, not shown, to a connecting strap 23 seen in Fig. 1. The connecting strap 23 likewise is bore or drilled as at 24 for passage therethrough of the connecting pin, not shown.

Other means for fastening the bit blocks 10 to each other through the means of the intermediate straps 23 may be provided, and the precise form of such means and the connecting strap is no part of the present invention.

The bit block 10 is generally made in a founding or forging operation and includes a bit lug 26 integral therewith and extending in a direction laterally of the guide 11. The bit lug 26 has a recess 27 therein which extends downward between the two spaced limbs 14 and 16. The recess 27 is generally of a rectangular cross-section so that the shank portion 28, also of a rectangular cross-section, of a cutter bit 29 may enter therein.

Such a cutter bit includes a cutting edge 31 formed from tungsten carbide or other similar abrasion resisting material, and the cutting end of the bit 29 may be raked as at 32 so as to provide clearance for the cutter bit when moving in the direction of the arrow seen in Fig. 2.

The recess 27 may be tilted as seen in Fig. 1 in varying amounts on either side of a vertical plane passing through the guide 11, as seen in Fig. 1, so that the cutter bits 29 will describe or cut a widened kerf for clearance of the bit block 10 and the guide 11.

As seen in Fig. 2, the shank portion 28 of the cutter 29 is upset as at 33 to provide a shoulder 34 limiting or locating the cutter bit 29 within the recess 27. The shank portion 28 of the cutter bit 29 is relieved as at 36 to provide a surface 37 thereon against which impinges a set screw 38 threaded into the bit lug 26.

As seen in Fig. 2, the shank portion 28 has what may be described as a loose fit within the recess 27 so that pressure exerted by the set screw 38 is such as to cant the shank portion 28 within the recess 27. In so doing, a surface 39 on the shank portion 28 comes into contact with a surface 41 of the recess 27. The recess 27 may be relieved as at 40, to provide canting of the shank 28 beyond the contact point 41. The line of effort of the set screw 38 is in a direction so that pressure will be had between the two surfaces 39 and 41 whilst the shoulder 34 of the cutter bit 29 will be urged into contact with the top of the bit lug 26.

Should the set screw 38 become loosened, the surface 37 on the shank portion 28 prevents movement of the shank portion 28 from the recess 27, and the pressure against the cutting edge 31 will be such as to tend to rock the cutter bit 29 in the clockwise position shown, thereby minimizing the need for extremely high pressures upon the set screw 38, since its function need be that necessary only to prevent withdrawal of the cutter bit 29 from the recess 27.

It will be apparent, therefore, that the function of the set screw 38 is such as to make use of the natural resiliency or elasticity of the shank portion 28, since the line of effort of the set screw 38 is such as to cant or wedge the shank portion 28 within the recess 27.

Referring now to Fig. 3, there is shown an embodiment whereby the recess is not relieved as at 40, as was the case in Fig. 2. In this embodiment of the invention the line of effort of the set screw 38 is such as to cause a point 39a on the shank 28 to be in contact with a point 41a on the recess 27, the line of effort of the set screw 38 being the same as before to cause canting of the shank 28 within the recess 27.

It will thus be apparent that there has been provided a novel mounting for the cutter bit of a cutter chain or the like, such mounting being characterized by employing the natural resiliency of the cutter bit shank for wedging thereof in its support recess. It is also believed apparent that the pressure exerting means does not need to be effective against a point on the one side of the cutter bit shank, to be distributed against the recess along the entire area of the opposite side of the cutter bit shank, but to be effective to cause canting or wedging movement of the cutter bit shank within its support recess.

Another feature of the invention resides in the provision of a securing means which is effective at the same time to prevent the unintended removal of the cutter bit shank although the pressure exerted thereby may become greatly lessened, the dimensions of the cutter bit shank and its contour with respect to the set screw being such as to prevent such unintended removal.

While the invention has been described in terms of a preferred embodiment thereof, its scope is intended to be limited only by the claims here appended.

I claim as my invention:

1. In a cutter bit and a mounting therefor wherein said cutter bit includes a cutter portion and a shank portion, said shank portion being arranged freely to enter a recess in said mounting having leading and trailing wall portions, a shoulder formed at the junction of said shank portion and said cutter portion at the trailing side of the cutter bit for locating said shank portion properly in said recess, and means for securing said cutter bit in said mounting comprising pressure exerting means held in said mounting at the trailing side thereof, a relieved portion on said shank portion spaced from said shoulder on the same side of the bit as said shoulder, said relieved portion having a surface against which said pressure exerting means bears and being of such a dimension whereby the shank portion is prevented from movement from said recess in spite of relief of pressure by said pressure exerting means, the line of effort of said pressure exerting means being in a direction so as to cant said shank portion in said recess in a direction corresponding to the direction of the cutting reaction on said cutter bits, with the trailing wall portion of said recess adjacent said shoulder in contact with said shank portion, and with a surface of said shank portion at the leading side thereof in contact with the leading wall portion of said recess at a point disposed between the contact surface of said shank portion with said trailing wall portion and the line of effort of said pressure exerting means on said shank portion.

2. In a cutter bit and a mounting therefor wherein said cutter bit includes a cutter portion and a shank portion having leading and trailing sides, said shank portion being arranged freely to enter a recess in said mounting, a shoulder formed at the juncture of said shank portion and said cutter portion on the trailing side of said cutter bit for locating said shank portion properly in said recess, and means for securing said cutter bit in said mounting comprising pressure exerting means held in said mounting, a relieved portion on the trailing side of the shank portion spaced from said shoulder, said relieved portion including a portion against which said pressure exerting means bears, the line of effort of said pressure exerting means being in a direction to cant said shank portion in said recess in the direction of the cutting reaction on said cutter bit, with a surface of said mounting underlying and adjacent said shoulder on said shank portion being contacted by the trailing side of said shank portion, and with a surface on the leading side of said shank portion in contact with said recess at a contact point spaced inwardly of said shoulder, said last named surface and contact point being disposed between the first mentioned of said contact surfaces and the line of effort of said pressure exerting means.

References Cited in the file of this patent
UNITED STATES PATENTS

| | | |
|---|---|---|
| 2,365,229 | Vanderzee | Dec. 19, 1944 |
| 2,521,089 | Phipps | Sept. 5, 1950 |
| 2,644,679 | Simmons | July 7, 1953 |